(12) United States Patent
Jordan et al.

(10) Patent No.: US 6,397,061 B1
(45) Date of Patent: May 28, 2002

(54) METHOD AND APPARATUS TO REPRIORITIZE DATA TRANSFER IN A SHORT RANGE AD HOC NETWORK

(75) Inventors: Larry David Jordan, Granbury, TX (US); Thomas Casey Hill, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/602,336

(22) Filed: Jun. 24, 2000

(51) Int. Cl.[7] .......................... H04M 11/00; H04B 15/00
(52) U.S. Cl. .......................... 455/421; 455/63; 455/574
(58) Field of Search .................... 455/421, 423, 455/425, 67.1, 67.7, 229, 517, 522, 69, 63, 574

(56) References Cited

U.S. PATENT DOCUMENTS

| | | | | |
|---|---|---|---|---|
| 5,193,216 A | * | 3/1993 | Davis | 455/67.7 |
| 5,493,717 A | * | 2/1996 | Schwarz | 455/306 |
| 5,682,379 A | * | 10/1997 | Mahany et al. | 370/311 |
| 5,809,414 A | * | 9/1998 | Coverdale et al. | 455/421 |
| 6,041,235 A | * | 3/2000 | Aalto | 455/437 |
| 6,047,171 A | * | 4/2000 | Khayrallah et al. | 455/266 |
| 6,072,784 A | * | 6/2000 | Agrawal et al. | 370/311 |
| 6,091,947 A | * | 7/2000 | Summer | 455/413 |
| 6,112,101 A | * | 8/2000 | Bhatia et al. | 455/512 |

\* cited by examiner

*Primary Examiner*—Nguyen T. Vo
(74) *Attorney, Agent, or Firm*—Charles W. Bethards; Hisashi D. Watanabe

(57) ABSTRACT

A wireless communication device capable of communicating with a local wireless network within a predetermined communication range. If the wireless communication device experiences interference, a low battery or movement outside of the predetermined communication range, the wireless communication device checks to see if a bandwidth, a data rate or a priority can be altered to complete the communication between the wireless communication device and the wireless network.

17 Claims, 2 Drawing Sheets

METHOD AND APPARATUS TO REPRIORITIZE DATA TRANSFER IN A SHORT RANGE AD HOC NETWORK

FIELD OF THE INVENTION

The present invention relates to a method and apparatus to improve the chance of completing a transaction in a short range wireless network as a short range wireless communication device moves out of range, experiences interference or begins to lose battery power.

BACKGROUND OF THE INVENTION

As local wireless networking becomes more common place in areas such as airports, malls, the home, and offices, for example, usage of small portable devices with limited battery power and a short range of communication will become more abundant. When these devices connect to a network via wireless access points, sharing of available bandwidth is based on various scheduling techniques, such as "first come" has the highest priority or "round robin" priority where all devices have equal priority for data transfer. Because of the limiting factors internal to mobile devices, no information is exchanged with the access point which could help prioritize the bandwidth to allow the completion of data transfers. In addition, the short range, nomadic nature of the coverage of these cells can frustrate a user who is trying to complete a transaction while moving out of range.

Thus, it is desirable to provide a way to improve the chances of completing a transaction in a short range ad hoc network as a user is moving out of range, begins to experience interference or begins to lose battery power.

BRIEF DESCRIPTION OF THE DRAWINGS

The features of the present invention that are believed to be novel are set forth with particularity in the appended claims. However, the invention together with further advantages thereof, may be best understood by reference to the accompanying drawings wherein:

DETAILED DESCRIPTION OF THE PREFERRED EMBODIMENT

Figure 1:
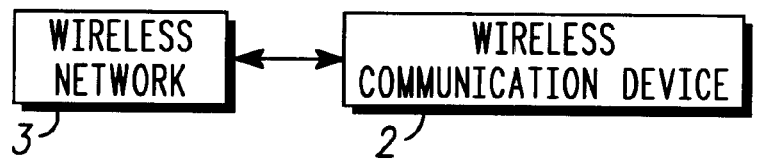
FIG. 1 is an overall system diagram according to the present invention.

FIG. 1 is an overall system diagram according to the present invention. Referring to FIG. 1, wireless communication device 2 can be a telephone, a cable telephony interface device, a cellular radiotelephone, a cordless radiotelephone, a radio, a personal digital assistant (PDA), a pager, a palm-top computer, a personal computer, or any Bluetooth enabled device which is capable of wirelessly communicating with another Bluetooth enabled device.

Wireless network 3 is preferably an Ad Hoc network, such as Bluetooth or IEEE802.11. Such a network is essentially a cooperative engagement of a collection of mobile nodes without the required intervention of a centralized access point or existing infrastructure. The links of the network are dynamic and are based on the proximity of one node to another node. One of the mobile nodes in the network acts as a master device to control communications between itself and slave devices which make up the remainder of the collection of mobile nodes for example a Bluetooth network. As seen in FIG. 1, wireless communication device 2 interacts with wireless network 3.

Figure 2:
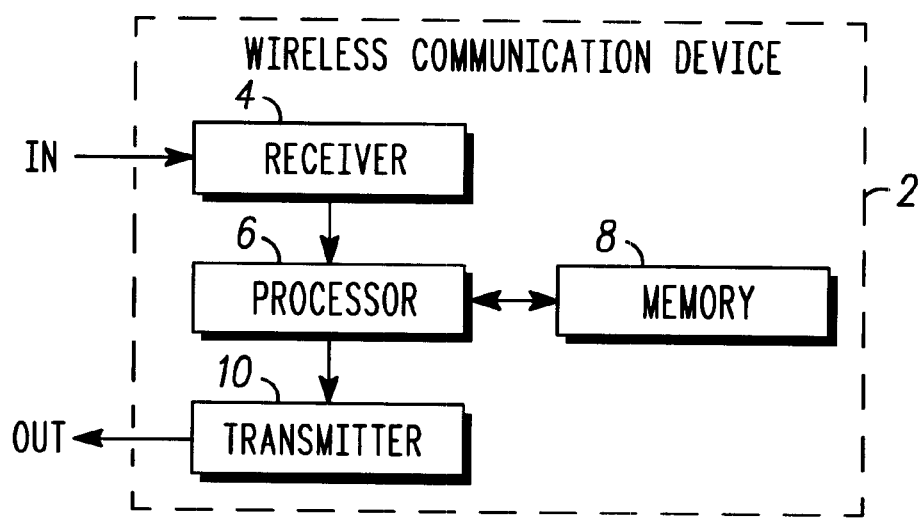
FIG. 2 is a diagram of a wireless communication device according to an embodiment of the present invention.

Referring now to FIG. 2, wireless communication device 2 is preferably a short-range wireless device such as a personal digital assistant, a cellular phone, a digital wallet, etc. Wireless communication device 2 may include a receiver 4, a processor 6, a memory 8 and a transmitter 10, inter-coupled as shown. In addition, wireless communication device 2 includes a battery (not shown) to supply power thereto and likely a user interface or I/O (not shown). For the purposes of this description, wireless communication device 2 is a slave device in wireless network 3.

Figure 3:
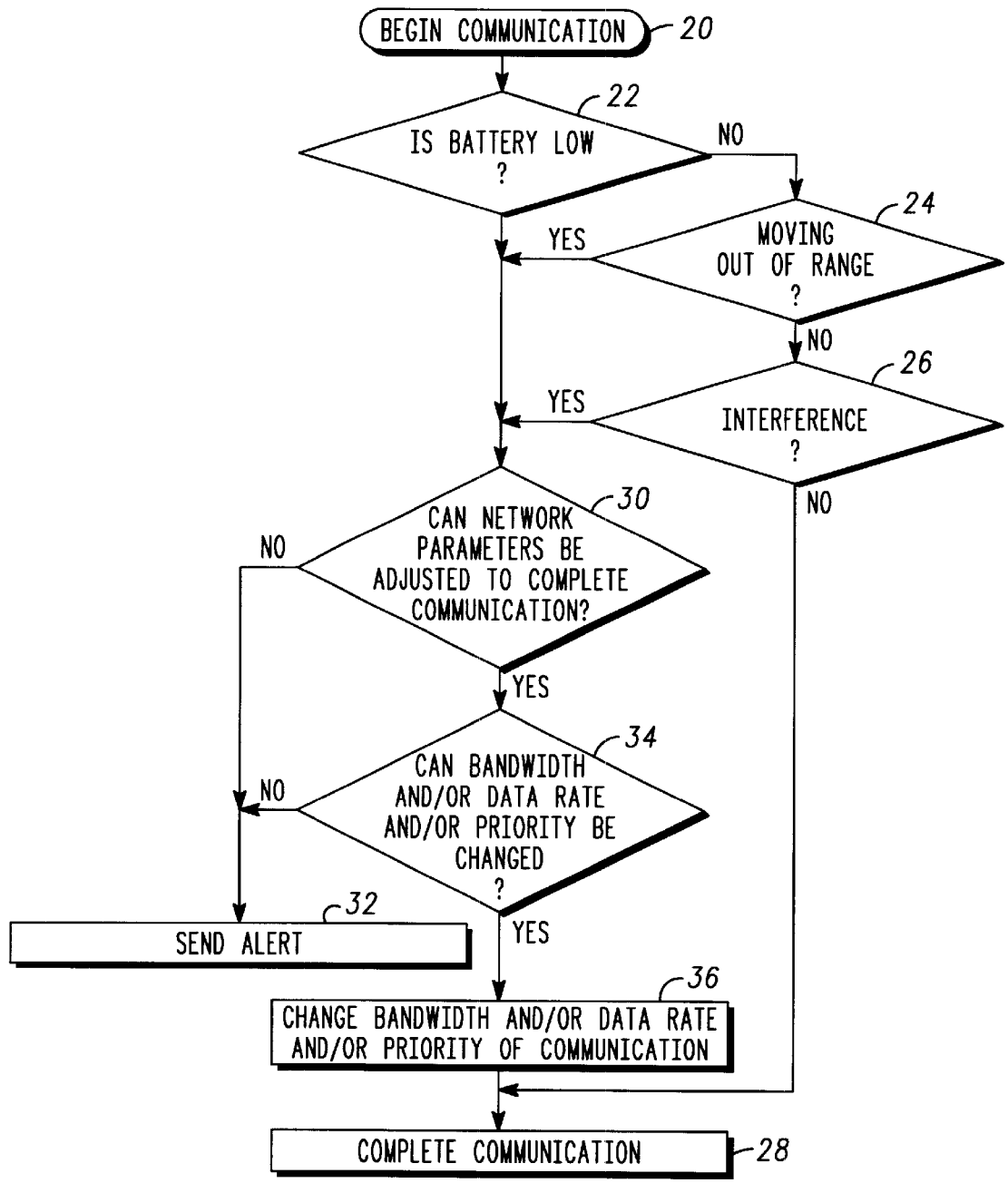
FIG. 3 is a flow chart showing a process by which communication can be completed according to an embodiment of the present invention.

FIG. 3 is a flow chart showing a process by which a communication operation can be completed according to an embodiment of the present invention. A communication operation can be any communication between wireless communication device 2 and wireless network 3 which is controlled by the master device within wireless network 3.

Referring to FIG. 3, in operation 20, wireless communication device 2 typically begins the communication operation with wireless network 3. Essentially, this includes establishing a communication link with wireless network 3. Then, wireless communication device will typically register with the master device (not shown) in wireless network 3 and perform a service discovery protocol operation with the master device.

From operation 20, the process moves to operation 22, where preferably it is determined whether a battery of wireless communication device 2 is insufficient to complete the communication operation. This determination can be made with reference to a threshold power level (voltage measurement usually), where an alert is provided if the power level of the battery drops below the threshold level. Typically, this will be accomplished with some type of measuring device (not shown) contained within wireless communication device 2, which can measure the amount of power remaining within the battery. If the power remaining in the battery drops below the predetermined threshold, an indicator (not shown), either visual or audio, can be triggered to alert a user of wireless communication device 2 that the battery power has dropped below the threshold, or is low.

In addition, such an alert could be transmitted to the master device, which controls communication within wireless network 3. In this case, the master device would be made aware of the low battery condition existing with wireless communication device 2. This is done so that the communication operation can be completed as quickly as possible.

If it is determined that the battery is not low, i.e., no alert has been triggered, the process moves from operation 22 to operation 24, where preferably it is determined whether wireless communication device 2 will soon be outside of its predetermined communication range (with respect to wireless network 3). The communication range of wireless communication device 2 may typically be in the range of 10 cm to 100 m, depending on the level of power supplied to the device. The determination of whether wireless communication device 2 will soon be outside of its communication range can be made by setting a signal level or RSSI threshold that equates to a first order with distance, which is within the maximum limit of the wireless communication device's range of communication, and alerting wireless communication device 2 and the master device in wireless network 3 in a manner similar to the manner in which the low battery condition is indicated to wireless communication device 2 and the master device in wireless network 3.

If it is determined in operation 24 that wireless communication device 2 will not soon be outside of communication range, the process moves from operation 24 to operation 26, where preferably it is determined whether interference sufficient to interfere with communications between wireless communication device 2 and wireless network 3 is present. The determination of whether there is sufficient interference to terminate, or substantially interfere with, communications between wireless communication device 2 and wireless network 3 could be made by a bit error rate threshold which could be measured by wireless communication device 2. However, any suitable method of determining signal interference levels or signal quality levels could be incorporated. An alert can be indicated at both wireless communication device 2 and the master device within wireless network 3, as in the case of the low battery as described above.

If it is determined in operation 26 that any interference experienced between wireless communication device 2 and wireless network 3 is insufficient to interfere with communications, the process preferably moves from operation 26 to operation 28, where the communication operation is typically completed.

If in operation 22, it is determined that the battery is low, the process moves from operation 22 to operation 30, where preferably wireless communication device 2, i.e., the slave device, requests that the master device determine whether parameters of wireless network 3 can be adjusted by the master device to complete the communication operation before the battery runs out of power. Specifically, if there is a strong likelihood that the communication operation between wireless communication device 2 and wireless network 3 will not be completed prior to termination of the communication link, the master device within wireless network 3 can possibly adjust the bandwidth used during communication with wireless communication device 2 and/ or the data rate of the communication or will reprioritize the communication operation to complete the communication operation before the communication link between wireless communication device 2 and wireless network 3 is terminated. Other communication parameters which can be adjusted to speed up completion of a communication operation can also be adjusted by the master device. In operation 30, the master device will determine, based on factors such as network capacity, interference conditions, etc., whether it is possible to adjust the above-mentioned parameters to complete the communication operation more quickly. Adjusting these parameters, by the master device, is well known in the art and will not be described herein.

If the parameters of wireless network 3 cannot be adjusted to complete the communication operation, the process moves from operation 30 to operation 32, where preferably an alert is transmitted from wireless network 3 to wireless communication device 2, where the alert can be displayed on wireless communication device 2 in a manner similar to alerting the user that the battery is low, or an audio indication can be provided to the user of wireless communication device 2. Essentially, the alert notifies wireless communication device 2, i.e., the slave device, that the parameters cannot be adjusted to speed up the communication operation.

However, if it is determined in operation 30 that network parameters can be adjusted to complete the communication operation, as discussed above, the process moves from operation 30 to operation 34, where it is preferably determined by the master device in wireless network 3 which parameters can be adjusted by the master device. Preferably, the master device contains the appropriate software and hardware to make this determination. A description of such software and hardware, which is well known in the art, will be omitted herein.

If it is determined in operation 34 that the bandwidth and/or the data rate and/or the priority can be adjusted, the process moves from operation 34 to operation 36, where preferably the bandwidth is adjusted and/or the data rate is increased and/or the priority is adjusted by the master device in wireless network 3 by a method well known in the art, as stated above.

The process then moves from operation 36 to operation 28, where typically the communication operation is completed.

If it is determined by the master device in operation 34 that neither the bandwidth nor the data rate nor the priority can be adjusted to speed up completion of the communication, the process preferably moves from operation 34 to operation 32, where an alert is sent from the master device to wireless communication device 2, as described above.

Thus, according to the present invention, certain parameters may be adjusted to ensure that a communication is completed before wireless communication device 2 encounters an alert condition, i.e., runs out of battery power, moves out of range and/or experiences interference.

While the operation shown in FIG. 3 and described above indicates a certain order or hierarchy to determining whether the battery is low, whether wireless communication device 2 will soon be out of communication range or whether interference is experienced, it should be understood that all of these conditions can be constantly monitored independent of each other and any one of these conditions can trigger a request by wireless communication device 2 to the master device to determine whether the communication operation can be quickly completed to avoid having the communication link termination before completion of the communication operation.

While the parameters discussed herein are limited to bandwidth, data rate and priority, it should be understood that other parameters of communication may be adjusted in a similar manner as described herein to complete a communication between a wireless device and a local wireless network.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A device to speed up a completion of a communication with a local wireless network, comprising:

a wireless communication device capable of communicating with the local wireless network within a communication range, wherein if the wireless communication device experiences at least one of interference and movement outside of the predetermined communication range, the wireless communication device is arranged to check for parameters of the local wireless network that can be altered to speed up the completion of the communication between the wireless communication device and the local wireless network.

2. The device as claimed in claim 1, wherein if there are no parameters of the local wireless network that can be altered to speed up the completion of the communication, the device is arranged to convey an alert to a user.

3. The device as claimed in claim 1, wherein the parameters include at least one of a bandwidth, a data rate and a priority.

4. The device as claimed in claim 3, wherein the bandwidth is adjusted to speed up the completion of the communication between the wireless communication device and the local wireless network.

5. The device as claimed in claim 3, wherein the data rate is adjusted to speed up the completion of the communication between the wireless communication device and the local wireless network.

6. The device as claimed in claim 3, wherein the priority is adjusted to speed up the completion of the communication between the wireless communication device and the local wireless network.

7. A method of speeding up a completion of a communication in a local wireless network including a wireless communication device, comprising the steps of:
   determining whether at least one of a plurality of alert conditions exist in the wireless communication device, wherein the alert conditions include moving out of communication range of the local wireless network and interference between the wireless communication device and the local wireless network; and
   speeding up the completion of the communication between the wireless communication device and the local wireless network if at least one of the alert conditions exists, by adjusting at least one of a plurality of parameters of the local wireless network.

8. The method as claimed in claim 7, wherein the parameters include at least one of a bandwidth, a data rate and a priority.

9. The method as claimed in claim 8, wherein the speeding step includes the step of adjusting the bandwidth of the local wireless network.

10. The method as claimed in claim 8, wherein the speeding step includes the step of adjusting the data rate between the wireless communication device and the local wireless network.

11. The method as claimed in claim 8, wherein the speeding step includes the step of adjusting the priority.

12. A communication method for speeding up a completion of a communication, comprising the steps of:
   beginning a communication operation between a wireless communication device and a local wireless network located within a communication range of the wireless communication device; and
   speeding up a completion of the communication operation by altering at least one of a plurality of parameters of the local wireless network if the wireless communication device is moving out of communication range or interference is experienced between the wireless communication device and the local wireless network, wherein the plurality of parameters include a bandwidth of the local wireless network, a rate of data transfer and an operation priority.

13. A device for speeding up a completion of a communication with a wireless communication device, comprising:
   a local wireless network capable of communicating with the wireless communication device located within a predetermined communication range, wherein if the wireless communication device experiences at least one of the group comprising interference and movement outside of the predetermined communication range, the local wireless network is arranged to cooperate with the wireless communication device to determine whether parameters of the local wireless network can be altered to speed up the completion of the communication between the wireless communication device and the local wireless network.

14. The device as claimed in claim 13, wherein the parameters include at least one of a bandwidth, a data rate and a priority.

15. The device as claimed in claim 14, wherein the local wireless network is arranged to adjust the bandwidth to speed up the completion of the communication between the wireless communication device and the local wireless network.

16. The device as claimed in claim 14, wherein the local wireless network is arranged to adjust the data rate to speed up the completion of the communication between the wireless communication device and the local wireless network.

17. The device as claimed in claim 14, wherein the local wireless network is arranged to adjust the priority to speed up the completion of the communication between the wireless communication device and the local wireless network.

* * * * *